(12) United States Patent
Ikeda et al.

(10) Patent No.: US 7,843,590 B2
(45) Date of Patent: Nov. 30, 2010

(54) INFORMATION MANAGEMENT METHOD AND INFORMATION MANAGEMENT SYSTEM

(75) Inventors: Hisashi Ikeda, Kunitachi (JP); Naohiro Furukawa, Tachikawa (JP); Kosuke Konishi, Hachioji (JP); Tsutomu Tashiro, Fujisawa (JP); Shoichi Nakagami, Miyoshi (JP)

(73) Assignee: Hitachi, Ltd., Tokyo (JP)

( * ) Notice: Subject to any disclaimer, the term of this patent is extended or adjusted under 35 U.S.C. 154(b) by 966 days.

(21) Appl. No.: 11/672,682

(22) Filed: Feb. 8, 2007

(65) Prior Publication Data
US 2007/0230750 A1    Oct. 4, 2007

(30) Foreign Application Priority Data
Apr. 4, 2006    (JP)    ............... 2006-103041

(51) Int. Cl.
  G06F 15/00    (2006.01)
  G06F 3/12    (2006.01)
  G06K 15/00    (2006.01)
  G06K 1/00    (2006.01)
(52) U.S. Cl. .................... 358/1.15; 358/1.14
(58) Field of Classification Search ........... 358/1.1, 358/1.13, 1.14, 1.15, 1.18; 710/7–9, 17–19; 709/202
See application file for complete search history.

(56) References Cited

U.S. PATENT DOCUMENTS

| 2004/0100363 A1* | 5/2004 | Lane et al. ................. 340/5.86 |
| 2005/0188306 A1* | 8/2005 | Mackenzie ................. 715/530 |
| 2005/0243369 A1* | 11/2005 | Goldstein et al. ......... 358/1.18 |

FOREIGN PATENT DOCUMENTS

| JP | 2005-135211 A | 5/2005 |
| WO | 01/71473 A1 | 9/2001 |

* cited by examiner

*Primary Examiner*—Douglas Q Tran
(74) *Attorney, Agent, or Firm*—Mattingly & Malur, P.C.

(57) ABSTRACT

Provided is an information management method for use in an information management system that includes a coordinate pointing device for identifying a paper medium, and a contents server for managing a digital document, and holds an attribute of the digital document and an attribute of a paper document obtained by printing the digital document on the paper medium, the information management method comprising: judging whether a paper document identified by the coordinate pointing device is a master of a document by referring to an attribute of the paper document; and permitting, when it is judged that the identified paper document is the master of the document, to update information annotated to the identified paper document in a digital document corresponding to the paper document to which the information has been annotated.

16 Claims, 22 Drawing Sheets

DIGITAL DOCUMENT INFORMATION

| | |
|---|---|
| DIGITAL FILE | DF028428.txt |
| DOCUMENT ID | DC028428 |
| OWNER USER ID | US000235 |
| CREATION DATE AND TIME | 10:00 2/10/2005 |
| UPDATE DATE AND TIME | 11:00 2/14/2005 |
| ACCESS DATE AND TIME | 12:00 2/15/2005 |
| ON-DISK SIZE | 456KB |
| CORRESPONDING APPLICATION | AAA Word Processor |
| ON-DISK STORAGE LOCATION | C:¥users |
| DIGITAL DOCUMENT ACCESS RIGHTS | Group Readable |
| NUMBER OF PRINT PAPER OBJECTS | 4 |
| PAPER OBJECT ID | PP593017 |
| | PP593023 |
| | PP593029 |
| | PP593032 |
| DIGITAL/PAPER CORRESPONDENCE TABLE | master |

FIG. 5

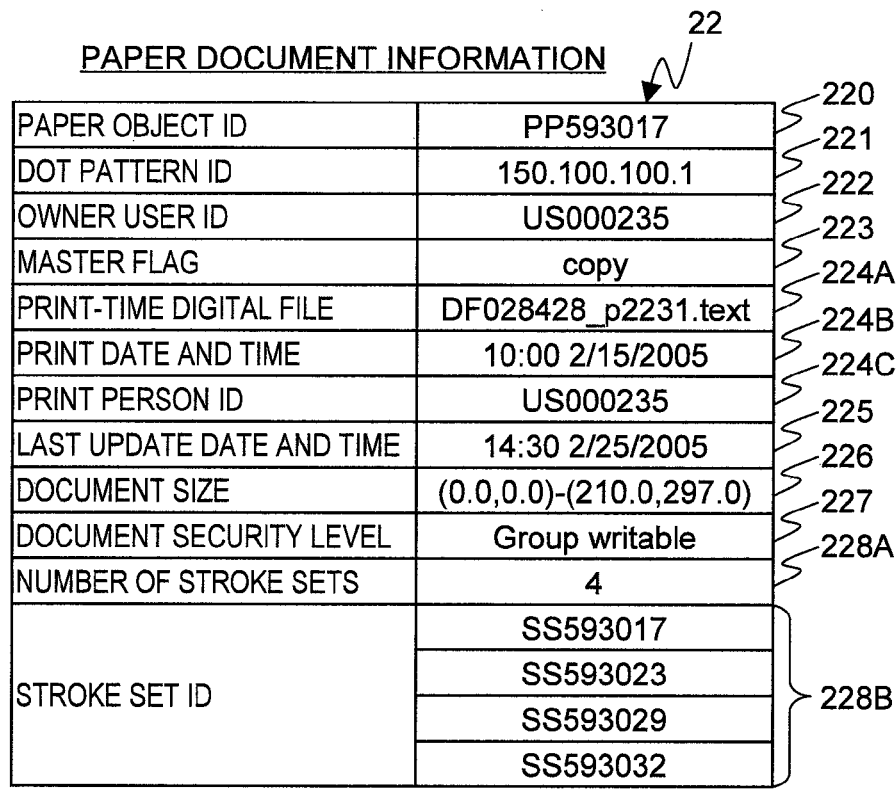

PAPER DOCUMENT INFORMATION

| PAPER OBJECT ID | PP593017 |
| --- | --- |
| DOT PATTERN ID | 150.100.100.1 |
| OWNER USER ID | US000235 |
| MASTER FLAG | copy |
| PRINT-TIME DIGITAL FILE | DF028428_p2231.text |
| PRINT DATE AND TIME | 10:00 2/15/2005 |
| PRINT PERSON ID | US000235 |
| LAST UPDATE DATE AND TIME | 14:30 2/25/2005 |
| DOCUMENT SIZE | (0.0,0.0)-(210.0,297.0) |
| DOCUMENT SECURITY LEVEL | Group writable |
| NUMBER OF STROKE SETS | 4 |
| STROKE SET ID | SS593017 |
|  | SS593023 |
|  | SS593029 |
|  | SS593032 |

FIG. 6

|  | MASTER OF DOCUMENT | NOT MASTER OF DOCUMENT |
| --- | --- | --- |
| PRINT CONTENTS COINCIDE WITH CONTENTS OF DIGITAL FILE | master | copy |
| PRINT CONTENTS ARE OLDER THAN CONTENTS OF DIGITAL FILE | — | out-of-date |
| NO PAPER DOCUMENT EXISTS | — | discarded |

FIG. 7

| STROKE SET INFORMATION | | |
|---|---|---|
| STROKE SET ID | SS593032 | |
| PEN ID | p00102 | |
| DATE AND TIME OF INITIAL ANNOTATION | 2004/11/27 10:11:15 | |
| CORRESPONDING RECTANGLE COORDINATE | ( 8.3, 65.8)-( 55.2,111.6) | |
| NUMBER OF STROKES | 15 | |
| STROK 1 | NUMBER OF SAMPLING POINTS | 4 |
| | SERIAL NUMBER | 1~4 |
| STROK 2 | NUMBER OF SAMPLING POINTS | 5 |
| | SERIAL NUMBER | 5~9 |
| STROK 3 | NUMBER OF SAMPLING POINTS | 3 |
| | SERIAL NUMBER | 10~12 |
| ... | ... | ... |

STROKE COORDINATE INFORMATION

| SERIAL NUMBER (251) | X COORDINATE (252) | Y COORDINATE (253) | OBTAINMENT TIME (254) |
|---|---|---|---|
| 1 | 8.3 | 86.8 | 0.00 |
| 2 | 15.8 | 83.4 | 0.25 |
| 3 | 30.3 | 80.5 | 0.50 |
| 4 | 45.1 | 75.4 | 0.75 |
| 5 | 25.5 | 65.8 | 2.50 |
| 6 | 25.7 | 75.6 | 2.75 |
| 7 | 26.5 | 90.6 | 3.00 |
| 8 | 25.9 | 110.5 | 3.25 |
| 9 | 26.5 | 123.5 | 3.50 |
| 10 | 14.5 | 88.9 | 4.75 |
| 11 | 15.0 | 97.3 | 5.00 |
| 12 | 16.5 | 101.9 | 5.25 |
|  | ... | ... |  |

FIG.11

USER INFORMATION

| USER ID | US000235 |
|---|---|
| NAME | TARO NISSEI |
| SECTION | RESEARCH AND DEVELOPMENT SECTION |
| POSITION | SECTION CHIEF |
| POSSESSION PEN ID | p0000101 |

FIG.12

MEETING ATTENDANCE TABLE

PLACE : ○○ BLDG., Xth FLOOR, △th MEETING ROOM

DATE AND TIME : DECEMBER 24 (FRIDAY)

PLEASE WRITE YOUR NAME

ATTENDEE

| SECTION | NAME |
|---|---|
| RESEARCH AND DEVELOPMENT SECTION | YAMADA |
| | |
| | |
| | |

DISCARD COMPLETELY — 311
DISCARD ONLY PAPER — 312
SET DIGITAL DOCUMENT AS MASTER — 313

| FILE EDIT VIEW TOOL HELP | | | |
|---|---|---|---|
| FOLDER | NAME | SIZE | UPDATE DATE AND TIME |
| ■ planning meeting<br>■ sales meeting<br>■ development meeting<br>■ fundamental<br>  technology<br>■ packing technology<br>■ software<br>  · specification.txt<br>  · drawing.fig<br>  · evaluation data.res<br>  · comment.txt<br>■ budget council<br>■ welfare activity | specification.txt<br>drawing.fig<br>evaluation data.res<br>comment.txt | 23KB<br>987KB<br>35KB<br>4KB | 2/4/2005<br>2/5/2005<br>1/31/2005<br>2/6/2005 |
| | PRINT MATTER | PRINT<br>PERSON | PRINT<br>DATE AND TIME | WRITE<br>PERSON | WRITE<br>DATE AND TIME |
| | specification_print1.prn<br>specification_print2.prn | A<br>A | 2/15/2005<br>2/16/2005 | A | 2/20/2005 |

| FILE EDIT VIEW TOOL HELP | | | | |
|---|---|---|---|---|
| FOLDER | NAME | SIZE | UPDATE DATE AND TIME | PRINT MATTER |
| ■ planning meeting<br>■ sales meeting<br>■ development meeting<br>■ fundamental technology<br>■ packing technology<br>■ software<br>　· specification.txt<br>　· drawing.fig<br>　· evaluation data.res<br>　· comment.txt<br>■ budget council<br>■ welfare activity | specification.txt<br>drawing.fig<br>evaluation data.res<br>comment.txt | 23KB<br>987KB<br>35KB<br>4KB | 2/4/2005<br>2/5/2005<br>1/31/2005<br>2/6/2005 | specification_print1.prn<br>specification_print2.prn<br>specification_print3.prn<br>specification_print4.prn |
| 401 | 402 | | | 403 |

FIG.20

| FILE EDIT VIEW TOOL HELP | | | |
|---|---|---|---|
| FOLDER | NAME | SIZE | UPDATE DATE AND TIME |
| ■ planning meeting<br>■ sales meeting<br>■ development meeting<br>■ fundamental technology<br>■ packing technology<br>■ software<br>　・specification.txt<br>　・drawing.fig<br>　・evaluation data.res<br>　・comment.txt<br>■ budget council<br>■ welfare activity | specification.txt<br>drawing.fig<br>evaluation data.res<br>comment.txt | 23KB<br>987KB<br>35KB<br>4KB | 2/4/2005<br>2/5/2005<br>1/31/2005<br>2/6/2005 |
| | PRINT MATTER | PRINT PERSON | PRINT DATE AND TIME | WRITE PERSON | WRITE DATE AND TIME |
| | specification_print1.prn<br>specification_print2.prn<br>specification_print3.prn | A<br>A<br>A | 2/15/2005<br>2/16/2005<br>2/16/2005 | A | 2/20/2005 |

| FILE | EDIT | VIEW | TOOL | HELP |
|---|---|---|---|---|

| FOLDER | NAME | SIZE | UPDATE DATE AND TIME |
|---|---|---|---|
| ■ planning meeting | specification.txt | 23KB | 2/4/2005 |
| ■ sales meeting | drawing.fig | 987KB | 2/5/2005 |
| ■ development meeting | evaluation data.res | 35KB | 1/31/2005 |
| ■ fundamental technology | comment.txt | 4KB | 2/6/2005 |
| ■ packing technology | | | |
| ■ software | | | |

| MASTER OF DOCUMENT | PRINT MATTER | PRINT PERSON | PRINT DATE AND TIME | WRITE PERSON | WRITE DATE AND TIME |
|---|---|---|---|---|---|
| ◎ | specification_print1.prn | a | 2/15/2005 | a | 2/20/2005 |
| | specification_print2.prn | a | 2/16/2005 | a | 2/20/2005 |
| | specification_print3.prn | a | 2/16/2005 | b | 2/22/2005 |
| | specification_print4.prn | a | 2/17/2005 | | |

- specification.txt
- drawing.fig
- evaluation data.res
- comment.txt

■ budget council
■ welfare activity

FIG.24

| FILE | EDIT | VIEW | TOOL | HELP | | | 402 |
|------|------|------|------|------|---|---|---|

| FOLDER | NAME | SIZE | UPDATE DATE AND TIME |
|--------|------|------|----------------------|
| ■ planning meeting<br>■ sales meeting<br>■ development meeting<br>■ fundamental technology<br>■ packing technology<br>■ software<br>　· specification.txt<br>　· drawing.fig<br>　· evaluation data.res<br>　· comment.txt<br>■ budget council<br>■ welfare activity | specification.txt<br>drawing.fig<br>evaluation data.res<br>comment.txt | 23KB<br>987KB<br>35KB<br>4KB | 2/4/2005<br>2/5/2005<br>1/31/2005<br>2/6/2005 |
| | PRINT MATTER | PRINT PERSON | PRINT DATE AND TIME | WRITE PERSON | WRITE DATE AND TIME |
| | specification_print1.prn<br>specification_print2.prn<br>specification_print3.prn | A<br>A<br>A | 2/15/2005<br>2/16/2005<br>2/16/2005 | A<br>A<br>B | 2/20/2005<br>2/20/2005<br>2/20/2005 |

401  403  407

| FILE EDIT VIEW TOOL HELP | | | |
|---|---|---|---|
| FOLDER | NAME | SIZE | UPDATE DATE AND TIME |
| ■ planning meeting<br>■ sales meeting<br>■ development meeting<br>■ fundamental technology<br>■ packing technology<br>■ software<br>　・specification.txt<br>　・drawing.fig<br>　・evaluation data.res<br>　・comment.txt<br>■ budget council<br>■ welfare activity | specification.txt<br>drawing.fig<br>evaluation data.res<br>comment.txt | 23KB<br>987KB<br>35KB<br>4KB | 2/4/2005<br>2/5/2005<br>1/31/2005<br>2/6/2005 |
| | PRINT MATTER | PRINT PERSON | PRINT DATE AND TIME | WRITE PERSON | WRITE DATE AND TIME |
| | specification_print1.prn<br>specification_print2.prn<br>specification_print3.prn | A<br>A<br>A | 2/15/2005<br>2/16/2005<br>2/16/2005 | A<br>A<br>B | 2/20/2005<br>2/20/2005<br>2/20/2005 |

FIG.25

INFORMATION MANAGEMENT METHOD AND INFORMATION MANAGEMENT SYSTEM

CLAIM OF PRIORITY

The present application claims priority from Japanese patent application 2006-103041 filed on Apr. 4, 2006, the content of which is hereby incorporated by reference into this application.

BACKGROUND OF THE INVENTION

This invention relates to an information management system for managing a document or the like, and more particularly, to a technology for managing a paper document and a digital document.

In recent years, as a result of advancement of a digital technology, it has become possible to digitize hand-written information annotated to paper with ease. However, currently, a computer manages only a digital document obtained by digitizing a paper document. Under this condition, hand-written information annotated to the paper document is not managed digitally, which makes it impossible to effectively use the hand-written information.

As a technology for solving this problem, there is proposed a hybrid document management system which can manage hand-written information. This hybrid document management system manages a document containing hand-written information without distinguishing between a paper document and a digital document.

Also, a pen-type input device (digital pen) that digitally obtains a path of a pen tip is put to practical use. The digital pen inputs the obtained pen tip path into a computer. Examples of the digital pen include the "Anoto pen" developed by Anoto AB in Sweden. The details of the digital pen are described in WO 01/71473 A1. The digital pen has an advantage that it is possible even for a user, who is not used to using a keyboard or a mouse, to use the pen easily, and is therefore expected to be applied to application tasks in the electronic government and other fields.

SUMMARY OF THE INVENTION

With the related technology described above, the paper document and the digital document have not been managed appropriately. It has been difficult to manage which of the paper document and the digital document should be dealt with as a master of the document and whether changes to the documents should be permitted. In other words, when the paper document is set as a master of the document, it is required that only a change to the paper document can be reflected in the digital document and a change to the digital document is restrained. In contrast, when the digital document is set as a master of the document, it is required that only a change to the digital document can be reflected in the paper document and a change to the paper document is restrained.

In addition, it is required to inform a user whether a document, to which he/she is attempting to make a change, is a master of the document and whether consistency with the latest version of the digital document is maintained. In other words, it is required to make it possible to confirm, at a computer, whether the paper document held by the user is a master of the document and whether the paper document is a document obtained by printing the latest version of the digital document.

A representative aspect of this invention is as follows. That is, there is provided an information management method for use in an information management system that includes a coordinate pointing device for identifying a paper medium, and a contents server for managing a digital document, and holds an attribute of the digital document and an attribute of a paper document obtained by printing the digital document on the paper medium, the information management method comprising: judging whether a paper document identified by the coordinate pointing device is a master of a document by referring to an attribute of the paper document; and permitting, when it is judged that the identified paper document is the master of the document, to update information annotated to the identified paper document in a digital document corresponding to the paper document to which the information has been annotated.

According to an aspect of this invention, it becomes possible to manage a paper document and a digital document as appropriate.

BRIEF DESCRIPTION OF THE DRAWINGS

The present invention can be appreciated by the description which follows in conjunction with the following figures, wherein:

FIG. 5 is a diagram of configuration of the digital document information stored in the contents server according to the embodiment of this invention;

FIG. 6 is a diagram of configuration of the paper document information stored in the contents server according to the embodiment of this invention;

FIG. 7 is an explanatory diagram of the master flag included in the paper document information according to the embodiment of this invention;

FIG. 11 is a diagram of configuration of the stroke coordinate information stored in the contents server according to the embodiment of this invention;

FIG. 12 is a diagram of configuration of the user information stored in the contents server according to the embodiment of this invention;

FIG. 18 is an explanatory diagram of a meeting attendance table according to the embodiment of this invention;

FIG. 19 is an explanatory diagram showing an example of a user interface;

FIG. 20 is an explanatory diagram showing an example of a user interface;

FIG. 21 is an explanatory diagram showing an example of a user interface;

FIG. 23 is an explanatory diagram showing an example of a user interface;

FIG. 24 is an explanatory diagram showing an example of a user interface; and

FIG. 25 is an explanatory diagram showing an example of a user interface.

DETAILED DESCRIPTION OF THE PREFERRED EMBODIMENTS

Next, an embodiment of this invention will be described with reference to the accompanying drawings.

Figure 1:
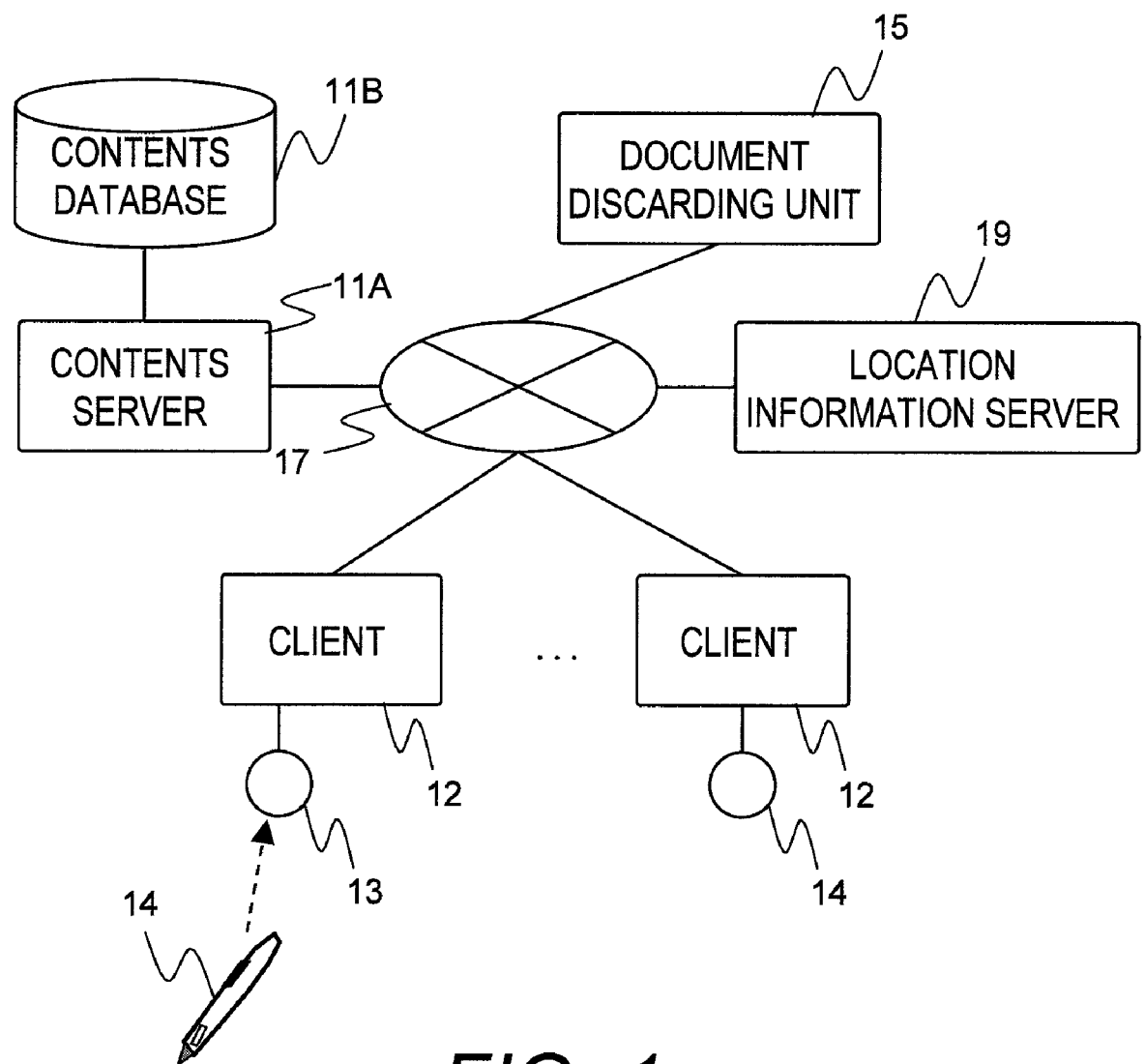
FIG. 1 is a block diagram of a document management system according to the embodiment of this invention.

FIG. 1 is a block diagram of a document management system according to the embodiment of this invention.

The document management system comprises a contents server 11A, a contents database 11B, client terminals 12, digital pen interfaces 13, a document discarding unit 15, a network 17, and a location information server 19.

The contents server 11A, the client terminals 12, the document discarding unit 15, and the location information server 19 are connected to one another through the network 17. The client terminals 12 and the digital pen interfaces 13 are connected in a wired manner using a universal serial bus (USB) protocol or the like. Alternatively, the client terminals 12 and the digital pen interfaces 13 may be connected in a wireless manner based on Bluetooth, a wireless LAN, a mobile telephone system, infrared rays, or the like.

The contents server 11A manages contents and transmits requested contents to the client terminals 12. The contents server 11A is connected to the contents database 11B. The contents database 11B stores digital documents.

Each client terminal 12 is a computer device used by a person and transfers information received from the digital pen interface 13 to the contents server 11A. To the client terminal 12, a printer is connected.

Also, the client terminal 12 displays contents (digital document) received from the contents server 11A and creates a paper document by printing the received digital document using the printer.

To the digital pen interface 13, a digital pen 14 is connected. Like in the case of an ordinary pen, with the digital pen 14, it is possible to annotate characters, figures, and the like to a paper medium. Also, the digital pen 14 comprises a micro-camera at its tip end and shoots image of a dot patter printed on the paper. Further, the digital pen 14 holds a pen ID set in advance. The digital pen 14 comprises a communication interface for connection with the digital pen interface 13 in a wired or wireless manner.

Figure 8:
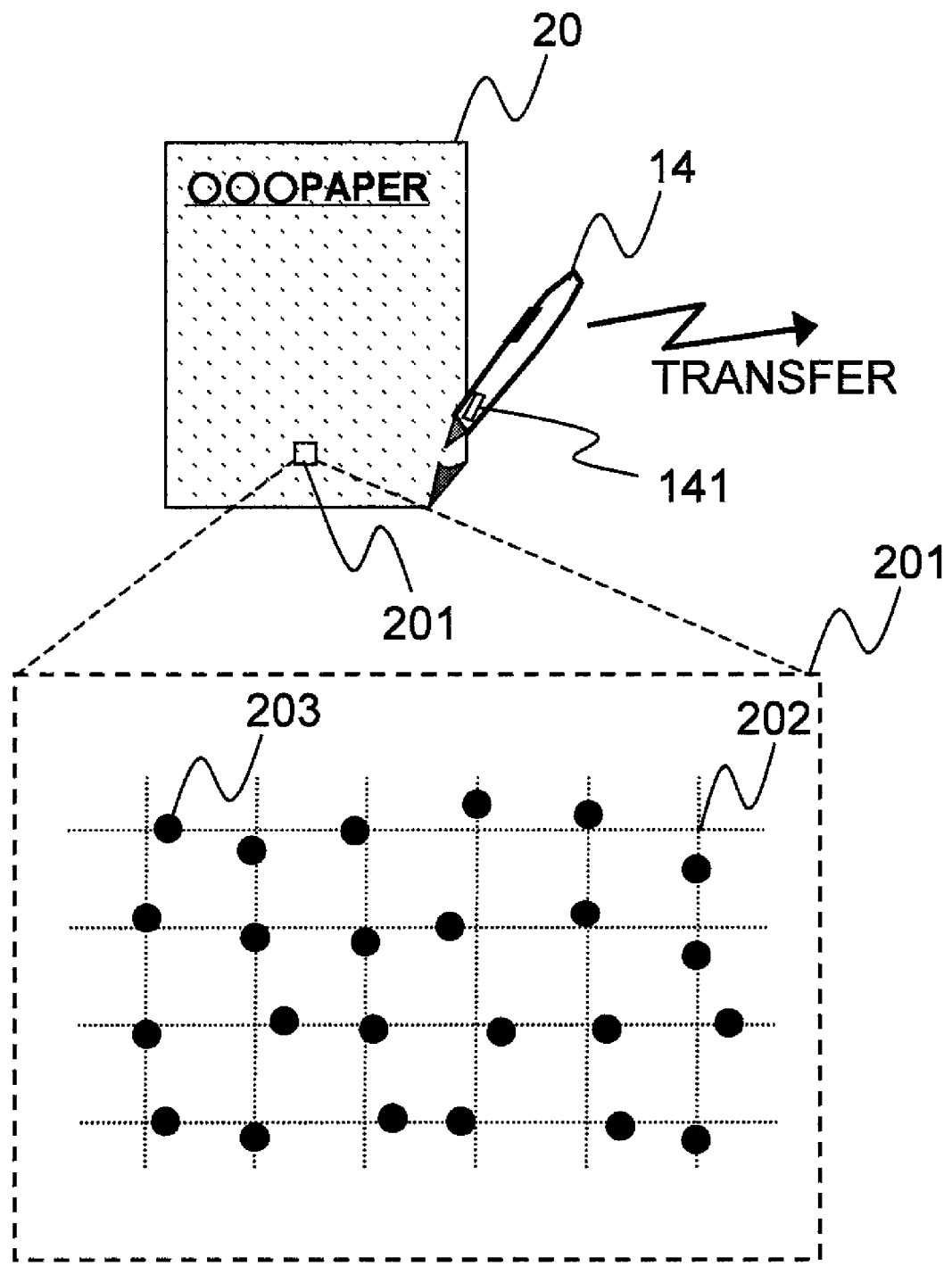
FIG. 8 is an explanatory diagram of obtainment of relative coordinates on paper by the digital pen according to the embodiment of this invention.

For instance, as shown in FIG. 8, the digital pen 14 obtains dot pattern information printed on a document. It is possible to compute coordinates in a dot pattern space from the dot pattern information. Also, it is possible to identify coordinates on the paper from the dot pattern information obtained by the digital pen 14 by referring to the location information server 19.

It should be noted here that it is also possible for the digital pen 14 to transmit, through a mobile telephone system or a wireless LAN system, the identified absolute coordinates, a time at which the dot pattern has been obtained, and the pen ID directly to the contents server 11A not through the client terminal 12.

The document discarding unit 15 is a unit, such as a shredder, which discards paper documents after placing the documents in an unusable state. In particular, the document discarding unit 15 according to this invention has a function of identifying paper documents to be discarded.

The location information server 19 is a computer device including a CPU, a memory, a storage device, holds a database on which the absolute coordinates in the dot pattern space computed by the digital pen 14 and the relative coordinates on the paper are associated with each other, and provides the relative coordinates on the paper based on the dot pattern on the paper.

Figure 2:
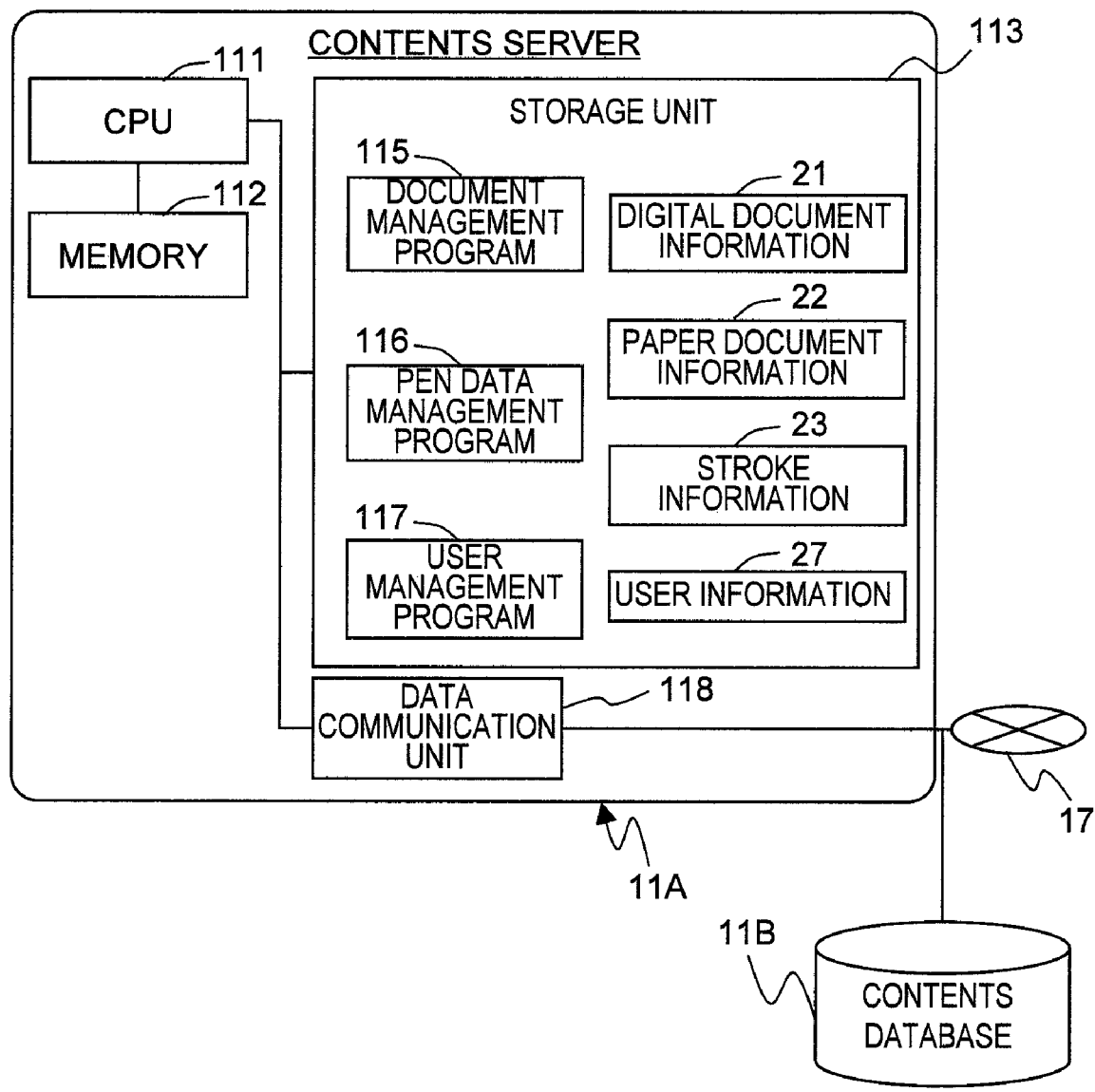
FIG. 2 is a block diagram of the contents server according to the embodiment of this invention.

FIG. 2 is a block diagram of the contents server 11A according to the embodiment of this invention.

The contents server 11A comprises a CPU 111, a memory 112, a storage unit 113, and a data communication unit 118.

The CPU 111 performs various kinds of processing by invoking and executing various programs stored in the storage unit 113. The memory 112 includes a work area in which data used by the CPU 111 in the various kinds of processing is stored temporarily.

The storage unit 113 is constructed by a nonvolatile storage medium (magnetic disk drive, for instance) and stores a document management program 115, a pen data management program 116, and a user management program 117. Those programs are loaded into the memory 112 and then are executed by the CPU 111, thereby performing the various kinds of processing.

Also, the storage unit 113 stores digital document information 21 (see FIG. 5), paper document information 22 (see FIG. 6), stroke information 23, and user information 27 (FIG. 12). The stroke information 23 includes stroke set information 24 (FIG. 10) and stroke coordinate information 25 (FIG. 11).

The document management program 115 manages the digital document information 21 and the paper document information 22. The pen data management program 116 manages the stroke information 23. The user management program 117 manages the user information 27.

The data communication unit 118 includes a network interface and a data interface. The network interface is a LAN card that is capable of performing communication using a TCP/IP protocol, for instance. The contents server 11A is capable of communicating with a device connected to the network 17, such as the client terminal 12, through the network interface. The data interface is an interface that is capable of transmitting and receiving data using a SCSI protocol, for instance. The contents server 11A is capable of reading and writing data from and into the contents database 11B (more precisely, an external storage device that stores the contents database) through the data interface.

Figure 3:
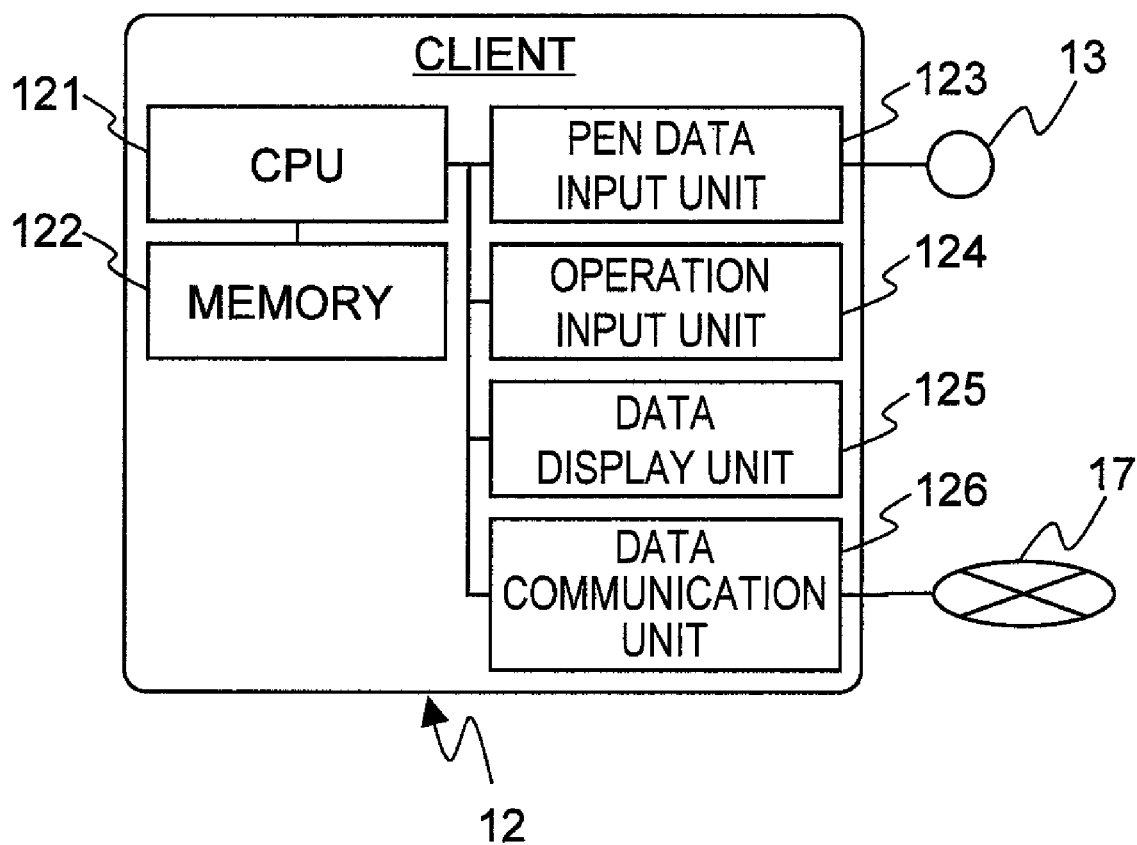
FIG. 3 is a block diagram of the client terminal according to the embodiment of this invention.

FIG. 3 is a block diagram of the client terminal 12 according to the embodiment of this invention.

The client terminal 12 comprises a CPU 121, a memory 122, a pen data input unit 123, an operation input unit 124, a data display unit 125, and a data communication unit 126.

The CPU 121 reads and executes various programs stored in a storage device (not shown), thereby performing various kinds of processing. The memory 122 includes a work area in which data used by the CPU 121 in the various kinds of processing is stored temporarily. Also, the memory 122 temporarily stores data sent from the contents server 11A and the digital pen 14.

The pen input unit 123 is connected with the digital pen interface 13 in a wired manner (using a USB protocol, for instance) or a wireless manner (based on Bluetooth or a wireless LAN, for instance) and collects information about coordinates and the like obtained by the digital pen 14.

The operation input unit 124 is a keyboard, for instance, and is used by a user to input information. The data display unit 125 is constructed using a liquid crystal display, for instance, and displays contents such as a document obtained from the contents server 11A.

The data communication unit 126 is a network interface such as a LAN card that is capable of performing communication using a TCP/IP protocol. With this construction, it becomes possible for the client terminal 12 to communicate with the contents server 11A through the network 17.

It should be noted here that the pen input unit 123 and the data communication unit 126 may be the same interface.

Figure 4:
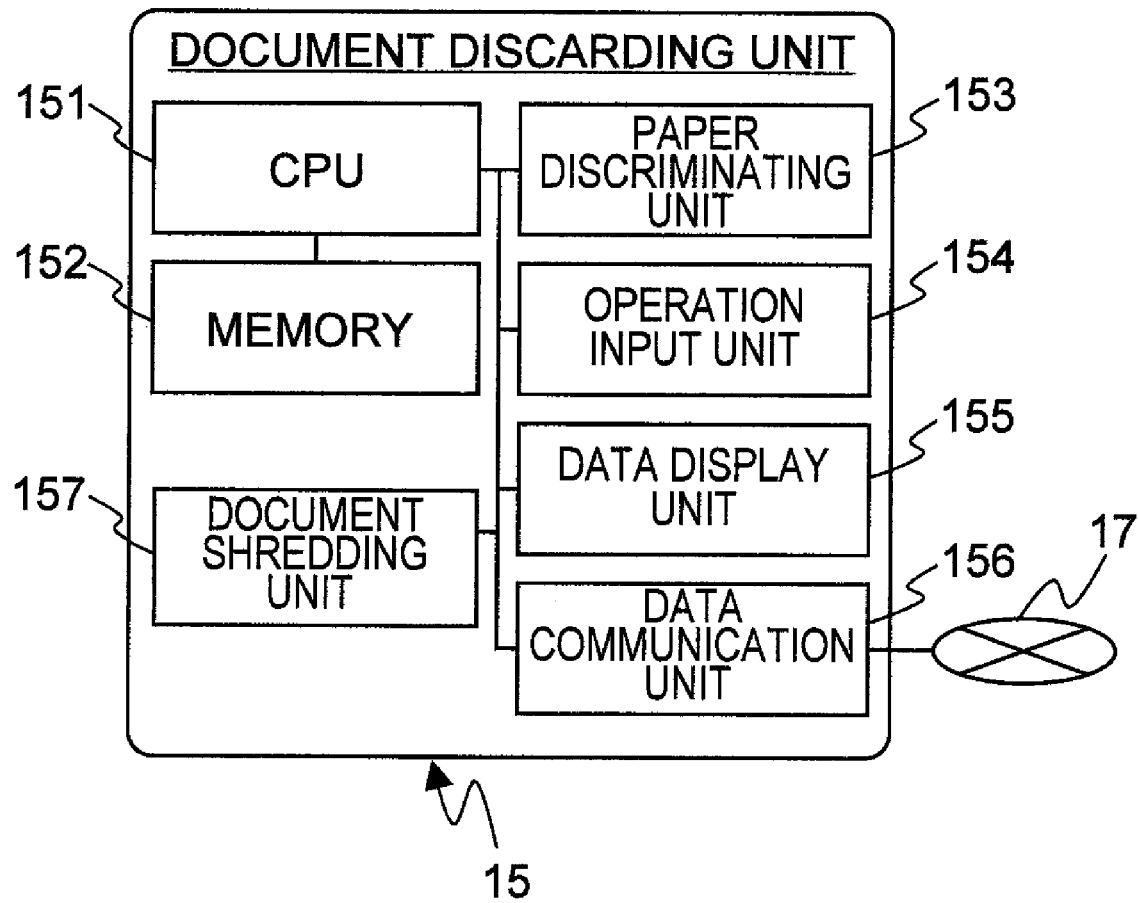
FIG. 4 is a block diagram of the document discarding unit according to the embodiment of this invention.

FIG. 4 is a block diagram of the document discarding unit 15 according to the embodiment of this invention.

The document discarding unit 15 comprises a CPU 151, a memory 152, a paper discriminating unit 153, an operation input unit 154, a data display unit 155, a data communication unit 156, and a document shredding unit 157.

The CPU 151 reads and executes various programs stored in a storage device (not shown), thereby performing various kinds of processing. The memory 152 includes a work area in which data used by the CPU 151 in the various kinds of processing is stored temporarily.

The paper discriminating unit 153 comprises a camera that photographs an image of paper in order to identify a paper document to be discarded. The CPU 151 identifies a document thrown in for discarding using an image photographed by the paper discriminating unit 153. Then, the CPU 151 judges whether it is possible to discard the thrown-in document.

The operation input unit 154 is a keyboard, for instance, and is used by a user to input information. The data display unit 155 is constructed using a liquid crystal display, for instance, and displays information about the document to be discarded.

The data communication unit 156 is a network interface such as a LAN card that is capable of performing communication using a TCP/IP protocol. With this construction, it becomes possible for the document discarding unit 15 to communicate with the contents server 11A through the network 17.

FIG. 5 is a diagram of configuration of the digital document information 21 stored in the contents server 11A according to the embodiment of this invention.

The digital document information 21 contains, for each digital document, a digital file 210, a document ID 211, an owner user ID 212, a creation date and time 213A, an update date and time 213B, an access date and time 213C, a size 214, a corresponding application 215, a pointer to the digital document 216, digital document access rights 217, a number of print paper objects 218A, paper object IDs 218B, and a digital/paper correspondence table 219.

The digital file 210 is a file name of the digital document. The document ID 211 is a unique identifier of the digital document. The owner user ID 212 is a unique identifier of a user who owns the digital document.

The creation date and time 213A is a creation date and time of the digital document. The update date and time 213B is the last update date and time of the digital document. The access date and time 213C is the last reading/writing date and time of the digital document.

The size 214 is a storage capacity that is necessary to store the digital document. The corresponding application 215 is the name of application software that is necessary to access the digital document. It should be noted that the application software used to read the digital document and the application software used to update the digital document may be different from each other. In this case, in the corresponding application field 215, multiple application software names are recorded.

The pointer to the digital document 216 is a location on a disk at which the digital document is stored. Through a path recorded as the pointer to the digital document 216, it is possible to access a corresponding digital file. The digital document access rights 217 are rights to access the digital document. For instance, information about a range of users, who are capable of viewing, updating, or accessing the digital document, is recorded.

The number of print paper objects 218A is the number of paper documents generated based on the digital document. The number of the recorded paper object IDs 218B is equal to the number of print paper objects 218A. Each paper object ID 218B is a unique identifier of a paper document generated from the digital document and is a link to the paper document information 22 (FIG. 6).

When a paper document is generated by printing the digital document, a new record of the paper document information 22 is created, the number of print paper objects 218A is incremented, and a paper object ID of the created paper document information 22 is recorded. On the other hand, when the paper document information 22 is erased at the time of discarding a paper document, the number of print paper objects 218A is decremented and a corresponding paper object ID 218B is erased.

The digital/paper correspondence table 219 shows whether the digital document is a master of a document. In other words, when the digital document is a master of the document (when no paper document is a master of the document), "master" is recorded. On the other hand, when a paper document generated through printing is set as a master of the document, the digital document becomes a non-master of the document and the digital/paper correspondence table 219 is changed to "locked".

The construction of the digital document information 21 described above is an example and it is sufficient that the digital document information 21 holds information showing whether the digital document is a master of the document and the held information is updated. In other words, it is sufficient that the digital document information 21 contains at least the digital file 210, the document ID 211, the paper object IDs 218B, and the digital/paper correspondence table 219.

FIG. 6 is a diagram of configuration of the paper document information 22 stored in the contents server 11A according to the embodiment of this invention.

The paper document information 22 contains, for each paper document, a paper object ID 220, a dot pattern ID 221, an owner user ID 222, a master flag 223, a print time digital file 224A, a print date and time 224B, a print person ID 224C, the last update date and time 225, a document size 226, a document security level 227, a number of stroke sets 228A, and stroke set IDs 228B.

The paper object ID 220 is a unique identifier of the paper document. It should be noted that even in the case of paper documents having the same information, when owned by different owners, the paper documents become different paper documents, so different paper object IDs 220 are assigned and different records of the paper document information 22 are generated. Ordinarily, paper documents printed by different users are printed along with different dot patterns.

The dot pattern ID 221 is an identifier of a dot pattern printed on the paper document. It should be noted that the paper document may be generated by printing information of the digital document on blank paper on which a dot pattern determined in advance has been printed.

The owner user ID 222 is a unique identifier of a user who owns the paper document. The master flag 223 indicates whether the paper document is a master of the document. As shown in FIG. 7, as the value of the master flag, there are four kinds of values.

The print time digital file 224A is a file name of digital data from which the paper document has been printed. The print date and time 224B is a print date and time of the paper document. The print person ID 224C is a unique identifier of a person who has printed the paper document. The print person ID 224C is the same as the owner user ID 222 in ordinary cases but there is also a case where the print person ID 224C is different from the owner user ID 222.

The last update date and time 225 is the last update date and time of the paper document through handwriting of a memo or the like on the paper document, for instance. The document size 226 shows the size of paper suited for printing of the paper document and a coordinate of a left upper corner of an area thereof and a coordinate of a right lower corner are stored. In the case shown in the drawing, the document size 226 is expressed in units of millimeter by setting the left upper corner as an origin.

The document security level 227 is a confidence level of the paper document. By the document security level 227, it is determined whether each user is capable of viewing the paper document and whether the user is capable of printing the document.

The number of stroke sets 228A is the number of stroke sets written on the paper document with the digital pen 14. The number of the recorded stroke set IDs 228B is equal to the number of stroke sets 228A.

Each stroke set is a collection of mutually related lines (strokes) and is obtained using layout analysis in character recognition, for instance. In the layout analysis, the mutually related lines are identified based on times, at which the lines have been annotated, and/or location relations among the lines, thereby obtaining the stroke set. In other words, strokes annotated at near times and near locations constitute one stroke set.

Figures 9, 10:
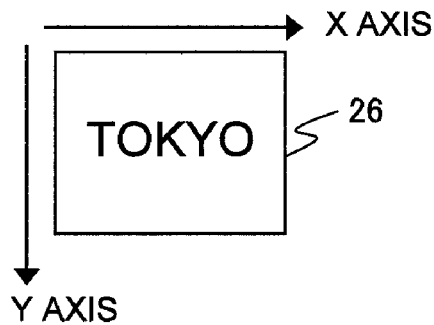
FIG. 9 is an explanatory diagram showing an example of a stroke set according to the embodiment of this invention.
FIG. 10 is a diagram of configuration of the stroke set information stored in the contents server according to the embodiment of this invention.

Each stroke set ID 228B is a unique identifier of a stroke set written on the paper document and is a link to the stroke set information 24 (FIG. 10).

The construction of the paper document information 22 described above is an example and it is sufficient that the paper document information 22 holds information showing whether the paper document is a master of the document and the held information is updated. In other words, it is sufficient that the paper document information 22 contains at least the paper object ID 220 and the master flag 223.

FIG. 7 is an explanatory diagram of the master flag 223 included in the paper document information according to the embodiment of this invention.

When the paper document is a master of the document, "master" is recorded in the master flag field 223. In this case, the digital/paper correspondence table 219 in the digital document information 21 becomes "locked" and it is inhibited to update the digital file (digital document). In this manner, consistency between contents printed on the paper and the contents of the digital file is maintained.

On the other hand, when the paper document is not a master of the document (when the digital document is a master of the document), one of three patterns of processing is performed.

First, when the contents printed on the paper and the contents of the digital file coincide with each other, "copy" is recorded in the master flag field 223. Secondly, when the contents printed on the paper and the contents of the digital file do not coincide with each other, "out-of-date" is recorded in the master flag field 223. Lastly, when the paper document does not exist because, for instance, the paper document has already been discarded, "discarded" is recorded in the master flag field 223.

In other words, it is possible to find which of the paper document and the digital document is a master of the document by referring to the master flag 223 in the paper document information 22.

FIG. 8 is an explanatory diagram of obtainment of relative coordinates on paper by the digital pen 14 according to the embodiment of this invention.

The digital pen 14 comprises a CPU, a memory, a communication interface, a camera 141, a battery, and a writing pressure sensor. Also, the digital pen 14 comprises a pen tip with which it is possible to write characters, symbols, and the like on paper with ink or graphite.

The digital pen 14 is used together with a sheet 20 on which dots 203 for location detection have been printed. Here, the dots 203 will be described by magnifying a part 201 of the sheet 20. On the sheet 20, multiple small dots 203 have been printed. Those dots 203 have been printed at locations displaced from intersections (reference points) 202 of virtual lattice lines upwardly, downwardly, rightwardly, or leftwardly.

When a character or a figure is annotated to the paper with the digital pen 14, the annotated character or the like remains on the paper in such a manner that visual recognition is possible. When detecting that the pen tip has contacted the paper using the writing pressure sensor, the digital pen 14 photographs the dots 203 printed on the paper with the camera 141. For instance, the digital pen 14 photographs an area containing six by six dots 203.

The digital pen 14 computes absolute coordinates, at which the dot pattern exists, from a combination of displacement manners of respective photographed dots. Those absolute coordinates are coordinates at which the dot pattern exists in a vast plane area. The vast plane area is an entire area in which arrangement of dot patterns without overlapping is possible.

The digital pen 14 transmits the computed absolute coordinates to the client terminal 12 through the digital pen interface 13. The client terminal 12 transmits the absolute coordinates transmitted from the digital pen 14 to the location information server 19. The location information server 19 identifies the location (dot pattern ID) of the paper in the vast plane area and coordinates (relative coordinates) on the paper sheet based on the absolute coordinates transmitted from the digital pen 14 and transmits the identified dot pattern ID and relative coordinates to the contents server 11A.

In the manner described above, the contents server 11A obtains the dot pattern ID and the relative coordinates from the dot pattern photographed by the digital pen 14.

Through periodic obtainment (in units of a fixed time, for instance) by the digital pen 14 of information about contact locations of the pen tip, it is possible to find movement of the pen tip. Then, the digital pen 14 transmits the absolute coordinates corresponding to the photographed dot pattern, a photographed time of the dot pattern and the pen ID to the client terminal 12.

The contents server 11A obtains the relative coordinates from the location information server 19 based on the absolute coordinates computed by the digital pen 14. The contents server 11A generates a path (stroke information) of the pen tip from the obtained relative coordinates and the photographed time of the dot pattern.

It should be noted here that the location information server 19 may be included in the contents server 11A instead of being provided separately.

Also, it is not required for the digital pen 14 to use the location information server 19 in order to identify the dot pattern ID and the relative coordinates. For instance, the sheet identification may be achieved using an identification number printed on the paper, a barcode printed on the paper, or an IC tag embedded in the paper. In addition, it is possible to identify locations (relative coordinates) on the sheet using a tablet. It should be noted that one of the sheet identification using an IC tag or the like and the location identification on the sheet using the tablet may be combined with the absolute coordinate identification by the location information server 19. In this case, it becomes possible to alleviate a load of processing in which the document management system identifies the dot pattern ID and the relative coordinates.

FIG. 9 shows an example of a stroke set 26 according to the embodiment of this invention.

The stroke set 26 is a set of strokes of characters "Tokyo" 311 annotated with the digital pen 14. In this embodiment, as shown in the drawing, a left upper corner is set as an origin, a horizontal direction is set as an X axis, and a vertical direction is set as a Y axis, thereby determining locations of the strokes.

As described above, the stroke set is a collection of mutually related lines (strokes) and is identified based on written times of the lines and/or location relations among the lines.

FIG. 10 is a diagram of configuration of the stroke set information 24 among the stroke information 23 stored in the contents server 11A according to the embodiment of this invention. In FIG. 10, stroke set information for the stroke set 26 shown in FIG. 9 is illustrated.

The stroke set information 24 contains, for each stroke set, a stroke set ID 241, a pen ID 242, an initial annotation date and time 243, a corresponding rectangle coordinate 244, a number of strokes 245, and stroke information 246.

The stroke set ID 241 is a unique identifier of the stroke set. The pen ID 242 is a unique identifier of the digital pen 14 used to annotate the stroke set.

The initial annotation date and time 243 is a date and time of initial annotation of the stroke set. The corresponding rectangle area 244 is a rectangle area containing the stroke set. The corresponding rectangle area 244 is coordinates (relative coordinates) on a document, on which the stroke set has been annotated, and is expressed by a coordinate of a left upper corner of the rectangular area and a coordinate of a right lower corner.

The number of strokes 245 is the number of lines (strokes) contained in the stroke set. Multiple pieces of stroke information 246, whose number is equal to the number of strokes 245, are recorded. Each piece of stroke information 246 contains a number of sampling points 246A and serial numbers 246B.

The number of sampling points 246A is the number of relative coordinates that constitute a corresponding stroke and have been obtained by the digital pen 14. Each serial number 246B is a unique identifier of one of the relative coordinates, which constitute the stroke and have been obtained by the digital pen 14, and is a link to the stroke coordinate information 25 (FIG. 11).

FIG. 11 is a diagram of configuration of the stroke coordinate information 25 of the stroke information 23 stored in the contents server 11A according to the embodiment of this invention.

The stroke coordinate information 25 contains, for each relative coordinate obtained by the digital pen 14, a serial number 251, an X coordinate 252, a Y coordinate 253, and an obtainment time 254.

The serial number 251 is a unique identifier of the relative coordinate obtained by the digital pen 14. The X coordinate 252 is a relative coordinate in a direction of the X axis shown in FIG. 9 and is expressed in units of millimeters, for instance. The Y coordinate 253 is a relative coordinate in a direction of the Y axis shown in FIG. 9 and is expressed in units of millimeters, for instance. The obtainment time 254 expresses an obtainment time of the relative coordinates by the digital pen 14. It should be noted that in an example shown in FIG. 11, in the obtainment time field 254, an elapsed time from an initial annotation time is recorded.

FIG. 12 is a diagram of configuration of the user information 27 stored in the contents server 11A according to the embodiment of this invention.

The user information 27 contains, for each user, a user ID 271, a name 272, a section 273, a position 274, and a possession pen ID 275.

The user ID 271 is a unique identifier of the user. The name 272 is the name of the user. The section 273 is a section of a company or the like to which the user belongs. The position 274 is a position of the user in the company or the like.

The possession pen ID 275 is a unique identifier of the digital pen 14 possessed by the user.

Next, processing in the document management system according to the embodiment of this invention will be described.

Figure 13:
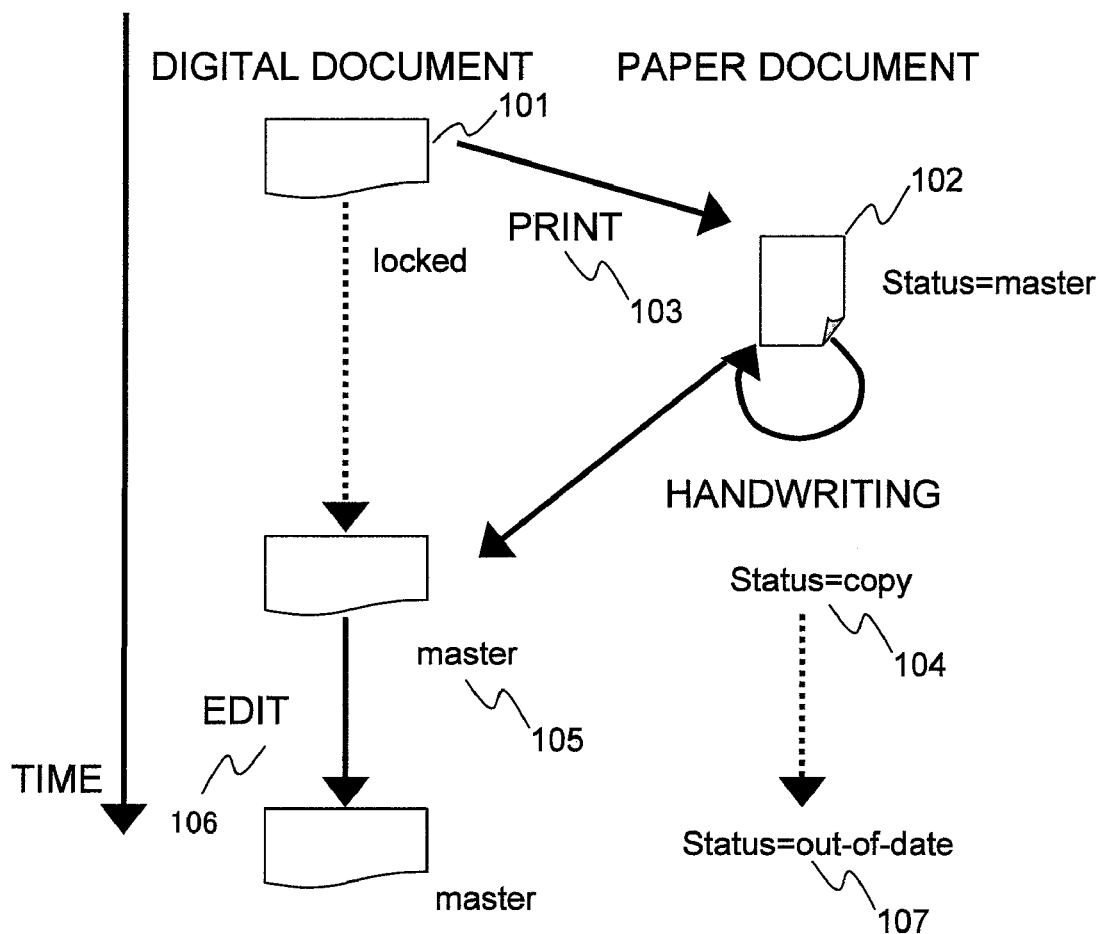
FIG. 13 is a flowchart of digital document update according to the embodiment of this invention.

FIG. 13 is a flowchart of digital document update according to the embodiment of this invention.

When a paper document 102 is printed from a digital document 101 (103) and the printed paper document 102 has been set as a master of the document, the master flag 223 for the paper document 102 is set at "master" and the digital/paper correspondence table 219 for the digital document 101 is set at "locked".

Following this, when a user annotates characters or the like to the paper document 102 that is a master of the document with the digital pen 14, the contents of the paper document 102 are changed. When doing so, when the user sets the digital document 101 as a master of the document, the paper document 102 becomes a non-master of the document and the master flag 223 for the paper document 102 becomes "copy" (104). Also, the digital/paper correspondence table 219 for the digital document 101 is set at "master" and the digital document 101 is set as a master of the document (105).

Following this, when the master of the document is edited, the digital document 101 is updated and the digital/paper correspondence table 219 for the digital document 101 remains "master" (106). As a result, consistency between the digital document 101 and the paper document 102 is lost, so the master flag 223 for the paper document 102 is set at "out-of-date" (107).

Next, the details of each processing will be described.

Figure 14:
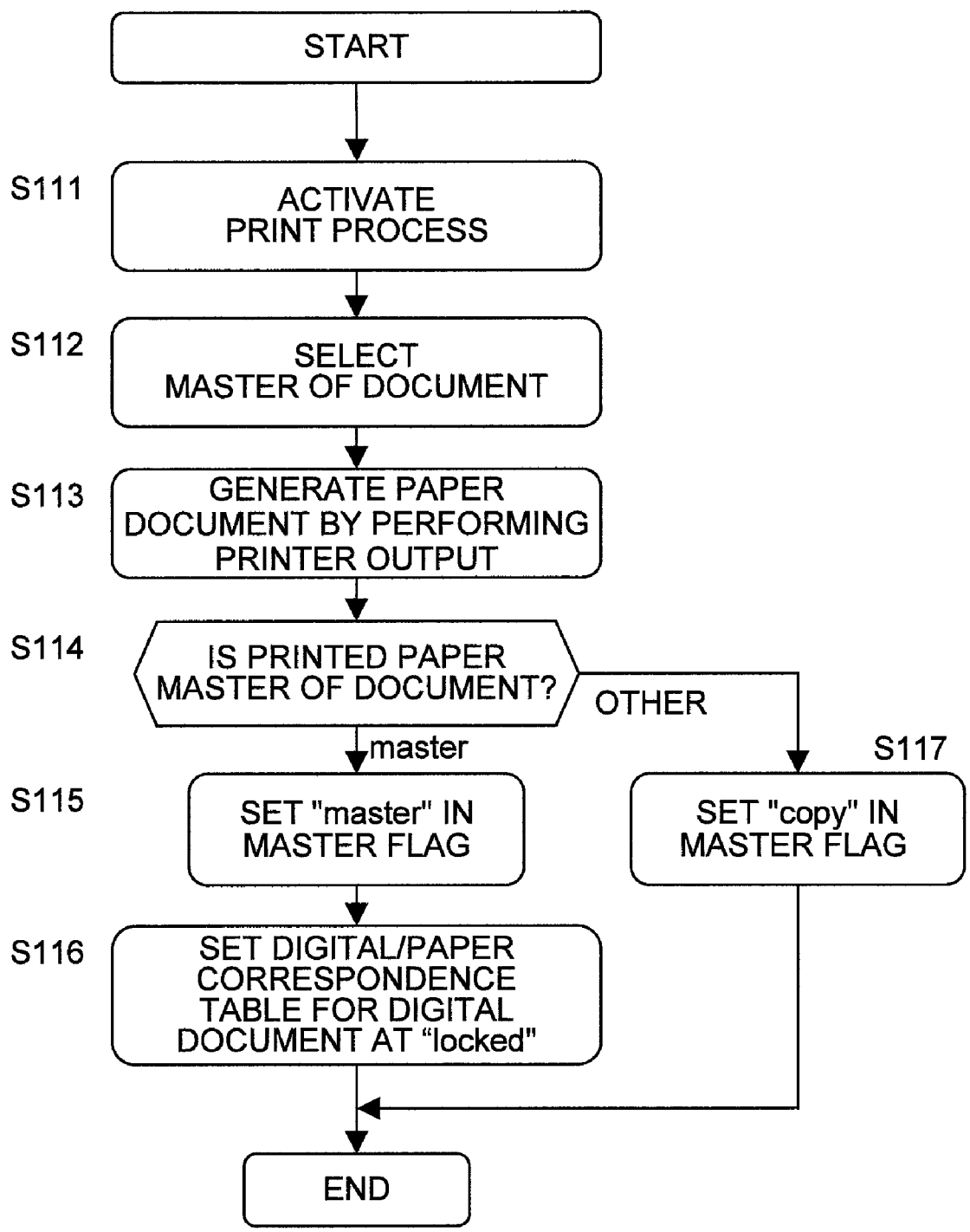
FIG. 14 is a flowchart of paper document print processing according to the embodiment of this invention.

FIG. 14 is a flowchart of paper document print processing according to the embodiment of this invention.

First, a user operates the client terminal 12 to instruct creation of a paper document by designating a document. When doing so, the user designates whether the generated paper document should be set as a master of the document.

When the client terminal 12 receives the paper document creation instruction, a print process is activated and information about the designated document is sent to the contents server 11A (S111). The contents server 11A selects a master of the document designated by the client terminal 12 by referring to the digital/paper correspondence table 219 in the digital document information 21 and the master flag 223 in the paper document information 22 and reads a corresponding digital document that is the master of the document from the contents database (S112). It should be noted that when the master of the document is not the digital document, the print processing may be terminated due to an error.

Following this, the contents server 11A transmits data of the read digital document to the printer. The printer generates a paper document by printing the data of the digital document along with a predetermined dot pattern (S113). Also, the contents server 11A registers a new record in the paper document information 22. Further, the contents server 11A increments the number of print paper objects 218A in the digital document information 21 and registers a newly registered paper object ID of the paper document as a paper object ID 218B in the digital document information 21.

Following this, the contents server 11A judges whether the printed paper document has been designated as a master of the document (S114). When it is found as a result of the judgment that the paper document has been designated as a master of the document, the master flag 223 of the newly registered paper document information 22 is set at "master" (S115). In addition, the digital/paper correspondence table 219 for the corresponding digital document is set at "locked".

On the other hand, when it is not found as a result of the judgment that the paper document has been designated as a master of the document, the master flag 223 in the newly registered paper document information 22 is set at "copy" (S117). In this case, the digital/paper correspondence table 219 for the corresponding digital document remains at "master".

Figure 15:
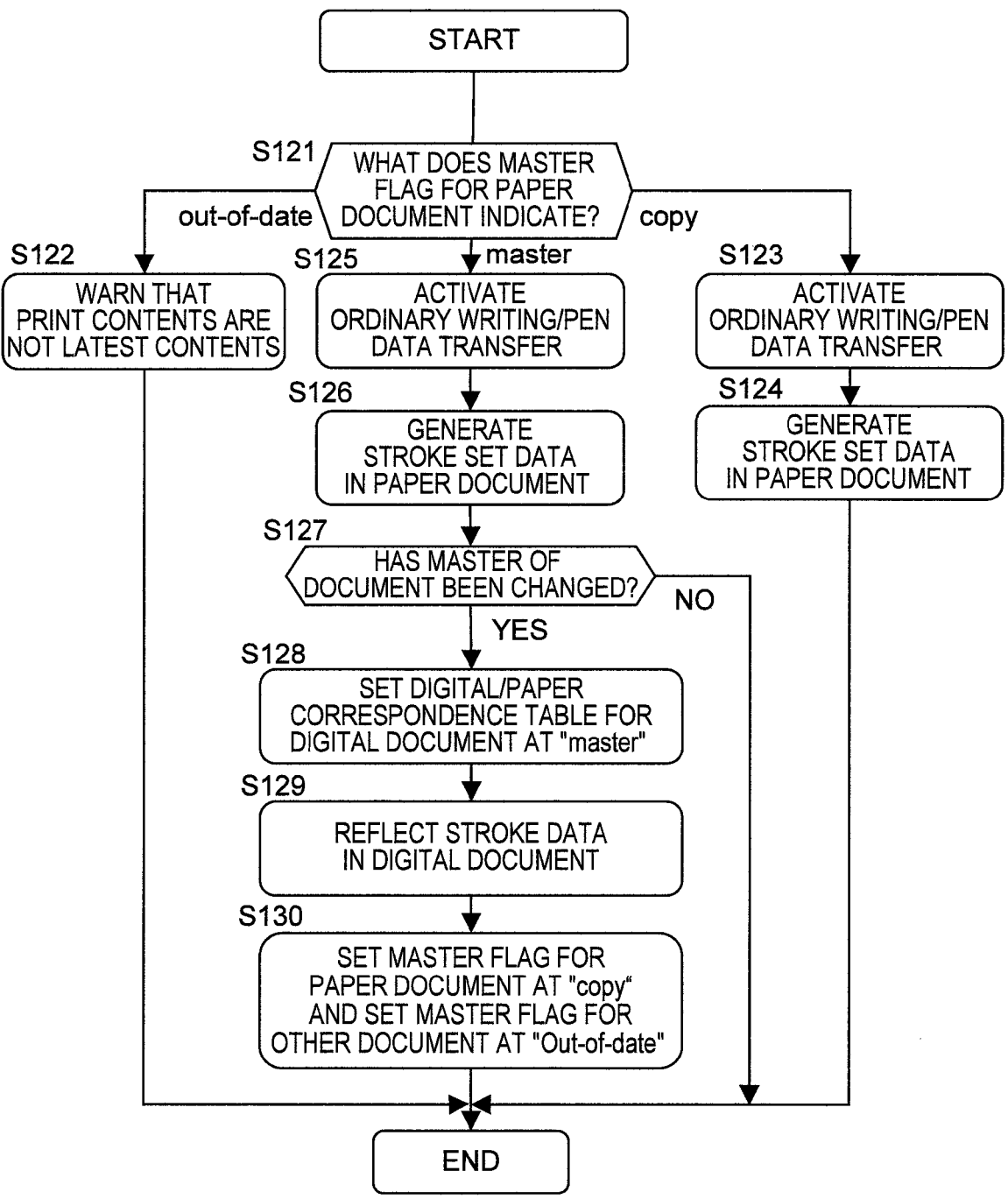
FIG. 15 is a flowchart of processing at the time of writing to a paper document according to the embodiment of this invention.

FIG. 15 is a flowchart of processing at the time of writing to a paper document according to the embodiment of this invention.

When a user annotates something to a paper document using the digital pen 14, the digital pen 14 photographs a dot pattern of the paper document that is an annotation target, identifies absolute coordinates of a location of the annotation, and sends the identified absolute coordinates to the contents server 11A. The contents server 11A refers to the dot pattern ID 221 in the paper document information 22 based on the identified absolute coordinates and identifies the paper document (paper object ID 220) that is the annotation target. Following this, the contents server 11A judges whether the identified paper document is a master of the document by referring to the master flag 223 for this paper document (S121).

When it is found as a result of the judgment that the master flag 223 is set at "out-of-date", this means that the contents printed on the paper and the contents of a corresponding digital file do not coincide with each other, so a warning that the contents printed on this paper document are not the latest contents is issued to the user (S122). The warning may be issued by emitting a warning sound from the digital pen 14 or vibrating the digital pen 14.

Also, when it is found as a result of the judgment that the master flag 223 is set at "copy", this means that the contents printed on the paper and the contents of the digital file coincide with each other, so the annotation to the paper document is permitted. Then, the digital pen 14 obtains stroke data and transfers the obtained data to the client terminal 12 without issuing the warning (S123).

The client terminal 12 transfers the received stroke data to the contents server 11A. The contents server 11A generates the stroke information 23 and increments the number of stroke sets 228A in the paper document information 22. Then, the contents server 11A records a stroke set ID 241 in the generated stroke information as a stroke set ID 228B (S124).

On the other hand, when it is found as a result of the judgment that the master flag 223 is set at "master", this means that the paper document is a master of the document, so the annotation to the paper document is permitted. Then, the digital pen 14 obtains stroke data and transfers the obtained data to the client terminal 12 without issuing the warning (S125).

The client terminal 12 transfers the received stroke data to the contents server 11A. The contents server 11A generates stroke information 23 and increments the number of stroke sets 228A in the paper document information 22. Then, the contents server 11A records a stroke set ID 241 in the generated stroke information as a stroke set ID 228B (S126).

Following this, it is judged whether the annotated paper document should remain as a master of the document (S127). For instance, in a meeting attendance table shown in FIG. 18, by touching "set digital document as master" with the digital pen, it is possible to make a selection in which a digital document is set as a master of the document.

When it is found as a result of the judgment that the annotated paper document should remain as a master of the document, this processing is ended.

On the other hand, when it is found as a result of the judgment that the annotated paper document should be set as a duplication and the digital document, in which the annotation with the digital pen has been reflected, should be set as a master of the document, the digital/paper correspondence table 219 in the digital document information 21 is changed to "master" (S128). Then, the file of the digital document is read and a digital file, in which stroke data has been reflected, is generated. Next, the digital file 210 in the digital document information is updated. It should be noted that when the already-existing digital file is overwritten, there is no necessity to update the digital file name 210.

Following this, the master flag 223 for the annotated paper document is changed to "copy" (S130). In addition, other related paper documents are identified by referring to the paper object IDs 218B in the digital document information 21. Then, each identified paper document has contents that do not coincide with the contents of the digital document, so the master flag 223 for the paper document is set at "out-of-date" (S130).

Figure 16:
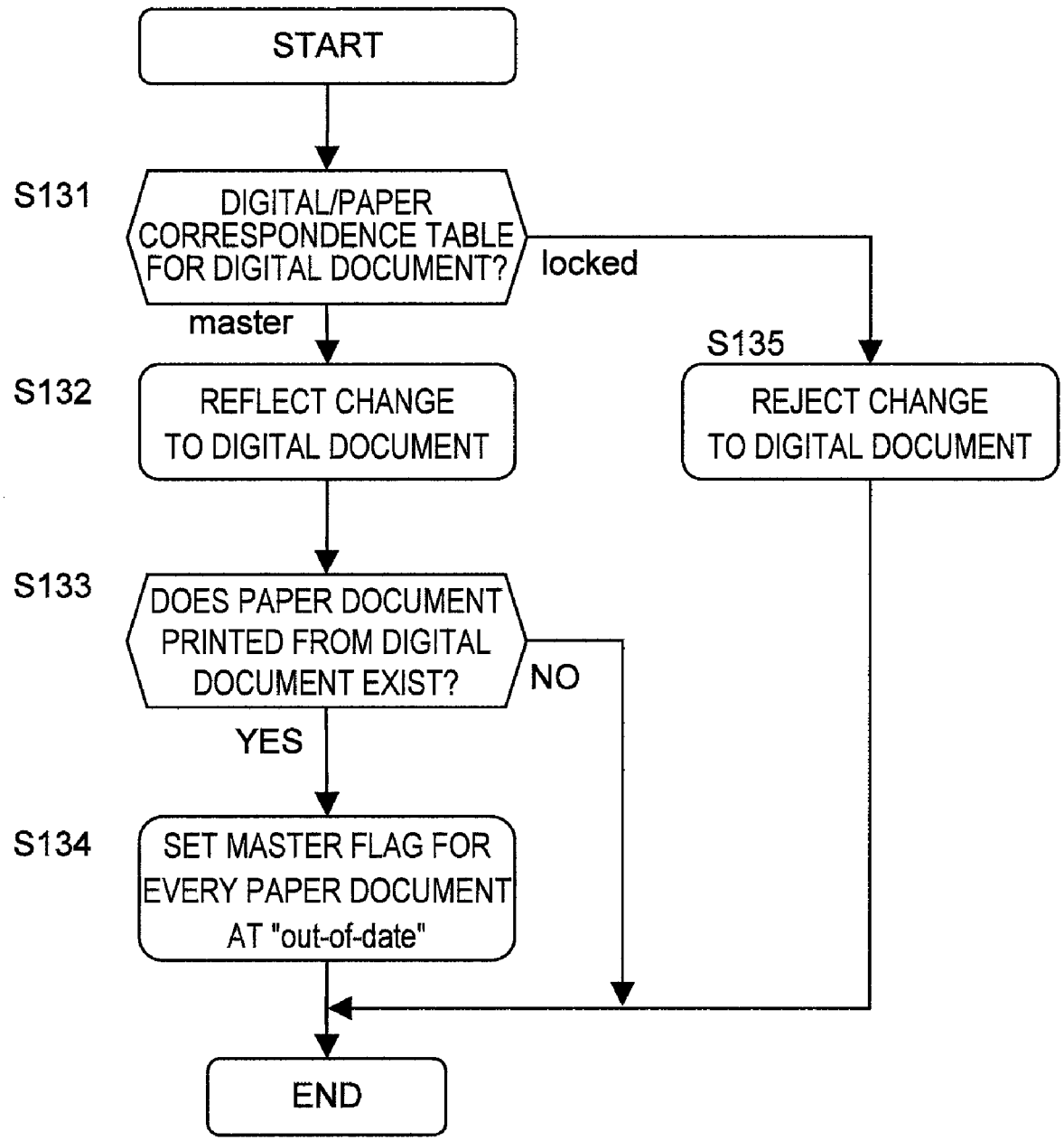
FIG. 16 is a flowchart of digital document update processing according to the embodiment of this invention.

FIG. 16 is a flowchart of digital document update processing according to the embodiment of this invention.

When receiving a request to update a digital document from the client terminal 12, the contents server 11A judges whether the digital document is a master of the document by referring to the digital/paper correspondence table 219 in the digital document information 21 (S131).

When it is found as a result of the judgment that the digital/paper correspondence table 219 is set at "locked", this means that the digital document is not a master of the document, so a change to the digital document is rejected (S135).

On the other hand, when it is found as a result of the judgment that the digital/paper correspondence table 219 is set at "master", this means that the digital document is a master of the document, so a change to the digital document is permitted. Then, a new digital document file is overwritten on an already-existing digital document file (S132). It should be noted that the digital file 210 in the digital document information 21 may be updated by saving a digital document file having a different file name.

Following this, it is judged whether any paper document printed from this digital document exists by referring to the number of print paper objects 218A in the digital document information 21 (S133).

Then, when it is found as a result of the judgment that the number of print paper objects 218A is not "0", this means that at least one paper document printed from this digital document exists, so each paper document printed from this digital document is identified by referring to the paper object IDs 218B. Next, the identified paper document has printed contents that do not coincide with the contents of the digital document, so the master flag 223 for the paper document is set at "out-of-date" (S134).

Figure 17:
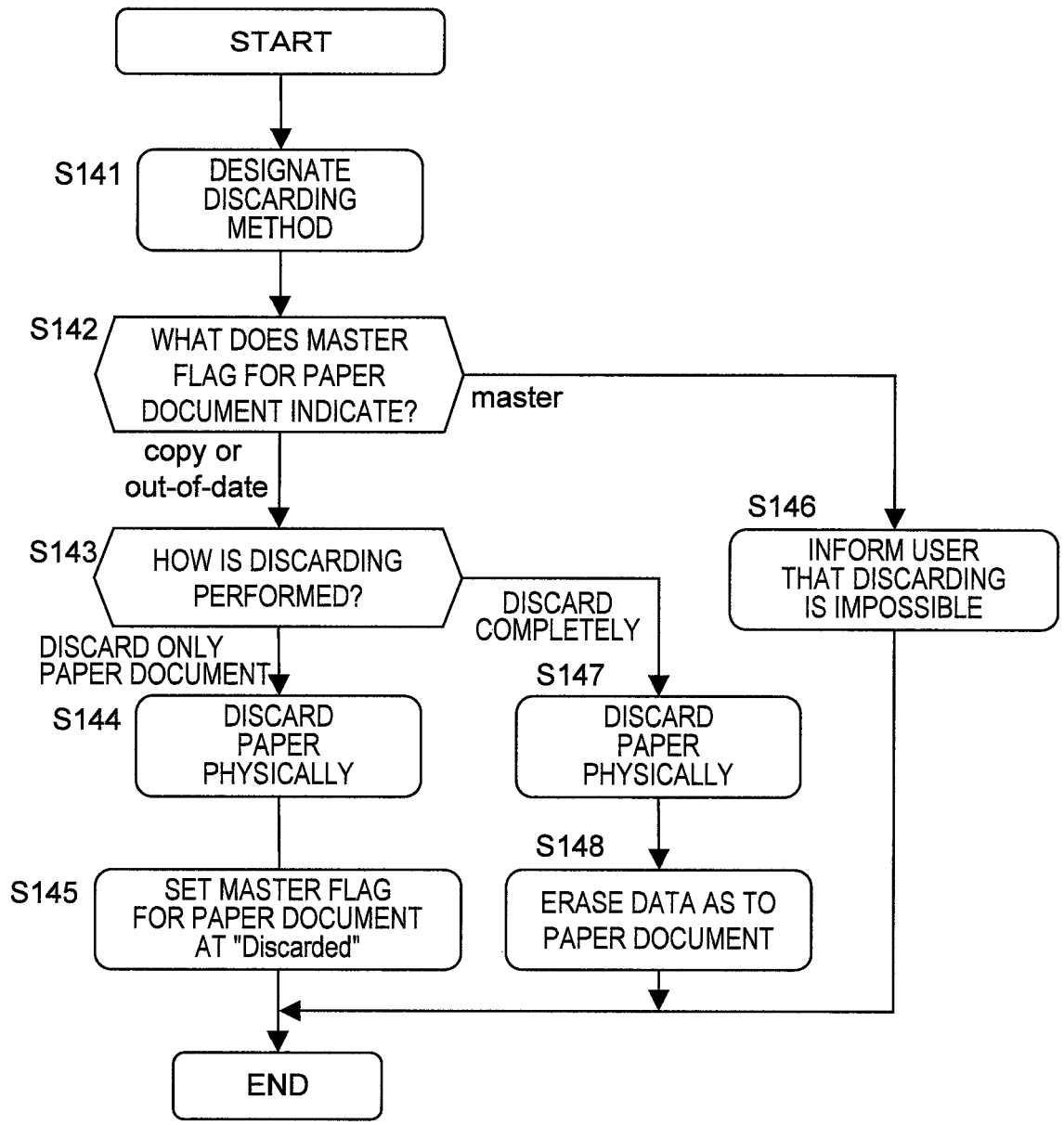
FIG. 17 is a flowchart of paper document discarding processing according to the embodiment of this invention.

FIG. 17 is a flowchart of paper document discarding processing according to the embodiment of this invention.

At the time of discarding a paper document using the document discarding unit 15, a user designates a method of discarding the paper document (S141). This discarding method designation is performed with the operation input unit 154 of the document discarding unit 15. Alternatively, the user may designate the paper document discarding method by, in the meeting attendance table shown in FIG. 18, touching "discard completely" 311 or "discard only paper" 312 with the digital pen.

The paper discriminating unit 153 photographs a dot pattern of the paper document to be discarded, identifies absolute coordinates of an annotation location, and sends the identified absolute coordinates to the contents server 11A.

The contents server 11A identifies the paper document (paper object ID 220) to be annotated by referring to the dot pattern ID 221 in the paper document information 22 based on the identified absolute coordinates. Following this, the contents server 11A judges whether the identified paper document is a master of the document by referring to the master flag 223 for this paper document (S142).

When it is found as a result of the judgment that the master flag is set at "master", this means that this paper document is a master of the document, so a notification that it is inhibited to discard the paper document is issued to the user (S146). This notification to the user is issued by causing the data display unit 155 of the document discarding unit 15 to display a warning and discharging the paper document that is a discarding target from the document discarding unit 15. Alternatively, the notification may be issued by emitting a warning sound from the digital pen 14 at the time of the selection of the discarding method with the digital pen 14.

On the other hand, when it is found as a result of the judgment that the master flag is set at "copy" or "out-of-date", this means that this paper document is not a master of the document. Therefore, it is judged which paper document discarding method has been designated (S143).

When it is found as a result of the judgment that the designated paper document discarding method is "discard only paper", the document shredding unit 157 discards a thrown-in paper document by placing the document in an unusable state through shredding (S144). Then, the document discarding unit 15 transmits the paper object ID of the discarded document and a master flag change request to the contents server 11A. The contents server 11A changes the master flag 223 for the paper document having the received paper object ID to "discarded" (S145).

On the other hand, when it is found as a result of the judgment that the designated paper document discarding method is "discard completely", the paper document information 22 for this paper document is also erased. More specifically, the document shredding unit 157 discards the thrown-in paper document by placing the document in an unusable state through shredding (S147). Then, the document discarding unit 15 transmits the paper object ID of the discarded document and a paper document information erasing request to the contents server 11A. The contents server 11A erases the paper document information 22 having the received paper object ID, erases a paper object ID 218B corresponding to the received paper object ID from the digital document information 21, and decrements the number of print paper objects 218A (S148).

FIG. 18 is an explanatory diagram of a meeting attendance table 30 according to the embodiment of this invention.

The meeting attendance table 30 is printed along with a specific dot pattern. It is possible to identify a paper object ID of this paper document through touch of the meeting attendance table by a user with the digital pen 14. In addition, it is also possible for the contents server 11A to identify a place that the user has touched with the digital pen 14.

In a lower area of the meeting attendance table 30, a field for instructing to change the states of the paper document and a corresponding digital document is provided. More specifically, "discard completely" 311, "discard only paper" 312, and "set digital document as master" 313 are printed.

As described above, when the user touches "discard completely" 311 with the digital pen 14 at the time of discarding the paper document, a method, with which erasing of the paper document information 22 is also performed in addition to the paper document discarding, is selected. Also, when the user touches "discard only paper" 312 with the digital pen 14 at the time of the paper document discarding, a method, with which the paper document information 22 is left at the time of the paper document discarding, is selected. Further, when the user touches "set digital document as master" 313 with the digital pen 14 at the time of annotation to the paper document, it is possible to make a selection in which the digital document is set as a master of the document.

FIGS. 19 to 25 are each an explanatory diagram of a user interface according to the embodiment of this invention.

FIGS. 19 and 20 each show an example of a user interface that associates digital documents and paper documents with each other. When a folder is selected in a left field (folder display area 401) in FIG. 19, information about digital documents (digital files) stored in the selected folder is displayed in a right upper field (digital document display area 402). Then, when a digital document is selected in the right upper field, each paper document printed from the selected digital document is displayed in a right lower field (paper document display area 403).

It should be noted here that in a state where no digital document has been selected in the digital document display area 402, each paper document printed from one of all digital documents displayed in the digital document display area 402 may be displayed in the paper document display area 403.

FIG. 20 shows a user interface in which the right fields of the screen explained with reference to FIG. 19 have been rearranged from a vertical direction to a horizontal direction. When a folder is selected in a left field (folder display area 401) in FIG. 20, information about digital documents stored in the selected folder is displayed in a middle field (digital document display area 402). Then, when a digital document is selected in the middle field, each paper document printed from the selected digital document is displayed in a right field (paper document display area 403).

FIG. 21 shows a state obtained from the screen state explained with reference to FIG. 19 by further printing a paper document. The printed paper document "specification_print 3.prn" 404 is additionally displayed in the paper document display area 403.

Figure 22:
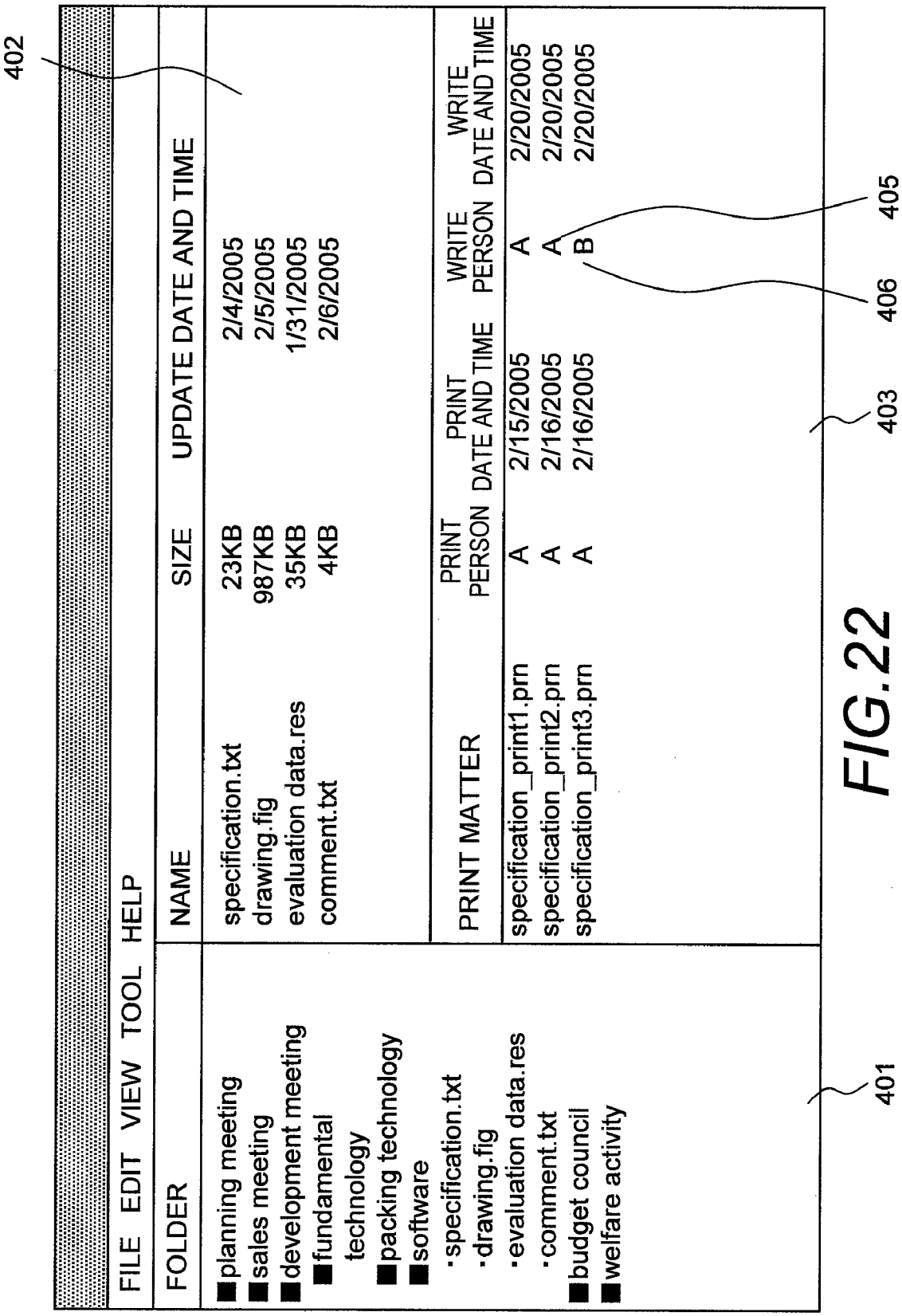
FIG. 22 is an explanatory diagram showing an example of a user interface.

FIG. 22 shows a state obtained from the screen state explained with reference to FIG. 21 by further annotating paper documents. It is indicated that a person "A" has annotated a paper document "specification_print 2. prn" on Feb. 22, 2005 (405). Also, it is indicated that a person "B" has annotated the paper document "specification_print 3. prn" on Feb. 22, 2005 (406).

When each person annotated a document is displayed, the pen ID 242 is identified by referring to the stroke set information 24 using the stroke set ID 228B in the paper document information 22 and further identifies the name 272 of the user by referring to the user information 27. Then, the identified name is displayed in the paper document display area 403.

FIGS. 23 and 24 each show a display example in the case where a paper document is set as a master of the document. In FIG. 23, for a paper document that is a master of the document, a mark (master sign 407) indicating that the document is a master of the document is displayed. In FIG. 24, a paper document that is a master of the document is highlight-displayed, thereby indicating that the document is a master of the document (407).

FIG. 25 shows an example of warning display in the case where a paper document is older than a corresponding digital document.

When the master flag in the paper document information 22 is set at "out-of-date", a corresponding paper document displayed in the paper document display area is highlight-displayed (408). Alternatively, it is judged that the paper document is older than a corresponding digital document through comparison of the update date and time of the digital document and the print date and time of the paper document with each other, and based on the judgment, the paper document may be highlight-displayed.

While the present invention has been described in detail and pictorially in the accompanying drawings, the present invention is not limited to such detail but covers various obvious modifications and equivalent arrangements, which fall within the purview of the appended claims.

What is claimed is:

1. An information management method for use in an information management system that includes a coordinate pointing device for identifying a paper medium, and a contents server for managing a digital document, and holds an attribute of the digital document and an attribute of a paper document obtained by printing the digital document on the paper medium, the information management method comprising:
   judging whether a paper document identified by the coordinate pointing device is a master of a document by referring to an attribute of the paper document; and
   permitting, when it is judged that the identified paper document is the master of the document, to update information annotated to the identified paper document in a digital document corresponding to the paper document to which the information has been annotated.

2. The information management method according to claim 1,
   wherein the paper document has location information which allows the coordinate pointing device to identify a location on the paper document, and
   wherein the information management method further comprises:
   identifying, by the coordinate pointing device, the location on the paper document by referring to the location information onto the paper document and obtains a time at which the location is identified,
   generating, by the contents server, stroke information indicating at least one stroke annotated on the paper document, based on the location on the paper document and the time obtained by the coordinate pointing device.

3. The information management method according to claim 1, further comprising preventing, when it is not judged that the paper document is the master of the document, to update the information annotated to the identified paper document to a digital document corresponding to the identified paper document to which the information has been annotated.

4. The information management method according to claim 1, further comprising:
   updating, in case of which it is judged that the identified paper document is the master of the document, the information annotated to the identified paper document in the digital document corresponding to the paper document to which the information has been annotated;
   judging whether the paper document to which the information has been annotated is maintained as the master of the document; and
   setting, when it is not judged that the paper document is maintained as the master of the document, the attribute of the paper document to which the information has been annotated to indicate a duplication of the document, and setting an attribute of the digital document updated by using the information annotated to the paper document to indicate a master of the document.

5. The information management method according to claim 1, further comprising:
   setting, when a plurality of paper documents corresponding to the digital document exist, in case of which an attribute of any of the plurality of paper documents corresponding to the digital document is set to indicate a master of the document, an attribute of the digital document corresponding to the paper document to indicate that a change to the digital document is inhibited; and
   setting, in case of which an attribute of none of the plurality of paper documents corresponding to the digital document is set to indicate a master of the document, the attribute of the digital document corresponding to the paper document to indicate a master of the document.

6. The information management method according to claim 5, further comprising managing, when the digital document is the master of the document, coincidence between the content of each of the plurality of paper documents corresponding to the digital document and the content of the digital document.

7. The information management method according to claim 5, further comprising generating a screen which displays information as to the digital document, information as to the plurality of paper documents, and information as to which one of the digital document and the plurality of paper documents is the master of the document.

8. The information management method according to claim 1, further comprising:
   notifying, at the time of discarding the paper document, in case of which the paper document is the master of the document, that discarding the paper document is inhibited; and
   holding, in case of which the paper document is not a master of the document, that the paper document has been discarded, after the paper document has been discarded.

9. An information management system, comprising:
   a coordinate pointing device for identifying a paper medium; and
   a contents server for managing a digital document, the information management system holding an attribute of the digital document and an attribute of a paper document obtained by printing the digital document on the paper medium, wherein the contents server is configured to:

judge whether a paper document identified by the coordinate pointing device is a master of a document by referring to an attribute of the paper document; and permit, when it is judged that the identified paper document is the master of the document, to update information annotated to the identified paper document in a digital document corresponding to the paper document to which the information has been annotated.

10. The information management system according to claim 9, wherein the paper document has location information which allows the coordinate pointing device to identify a location on the paper document, wherein the coordinate pointing device identifies the location on the paper document by referring to the location information onto the paper document and obtains a time at which the location is identified, and wherein the contents server generates stroke information indicating at least one stroke annotated on the paper document, based on the location on the paper document and the time obtained by the coordinate pointing device.

11. The information management system according to claim 9, wherein when it is not judged that the paper document is the master of the document, the contents server prevents to update the information annotated to the identified paper document to a digital document corresponding to the identified paper document to which the information has been annotated.

12. The information management system according to claim 9, wherein the contents server is configured to:

update, in case of which it is judged that the identified paper document is the master of the document, the information annotated to identified the paper document in the digital document corresponding to the paper document to which the information has been annotated;

judge whether the paper document to which the information has been annotated is maintained as the master of the document; and set, when it is not judged that the paper document is maintained as the master of the document, the attribute of the paper document to which the information has been annotated to indicate a duplication of the document, and setting an attribute of the digital document updated by using the information annotated to the paper document to indicate a master of the document.

13. The information management system according to claim 9, wherein the contents server is configured to:

set, when a plurality of paper documents corresponding to the digital document exist, in case of which an attribute of any of the plurality of paper documents corresponding to the digital document is set to indicate a master of the document, an attribute of the digital document corresponding to the paper document to indicate that a change to the digital document is inhibited; and set, in case of which an attribute of none of the plurality of paper documents corresponding to the digital document is set to indicate a master of the document, the attribute of the digital document corresponding to the paper document to indicate a master of the document.

14. The information management system according to claim 13, wherein the contents server manages, when the digital document is the master of the document, coincidence between the content of each of the plurality of paper documents corresponding to the digital document and the content of the digital document.

15. The information management system according to claim 13, wherein the contents server generates a screen which displays information as to the digital document, information as to the plurality of paper documents, and information as to which one of the digital document and the plurality of paper documents is the master of the document.

16. The information management system according to claim 9, wherein the contents server is configured to:

notify, at the time of discarding the paper document, in case of which the paper document is the master of the document, that discarding the paper document is inhibited; and hold in case of which the paper document is not a master of the document, that the paper document has been discarded, after the paper document has been discarded.

* * * * *